United States Patent
Rachal et al.

(10) Patent No.: US 6,286,246 B1
(45) Date of Patent: Sep. 11, 2001

(54) ELECTROSTATICALLY FLOCKED FISHING LURES AND RELATED SYSTEMS AND METHODS

(75) Inventors: Richard N. Rachal, Sandy; Paul Lewis, Midvale, both of UT (US)

(73) Assignee: Ultradent Products, Inc., Sandy, UT (US)

( * ) Notice: Subject to any disclaimer, the term of this patent is extended or adjusted under 35 U.S.C. 154(b) by 0 days.

(21) Appl. No.: 09/496,275

(22) Filed: Feb. 1, 2000

(51) Int. Cl.⁷ .......................... A01K 85/00; A01K 85/01; A01K 85/08
(52) U.S. Cl. .......................... 43/42.25; 43/42.53; 43/17.6; 427/206; 427/462
(58) Field of Search .............................. 43/42.25, 42.53, 43/17.5, 17.6, 42.32, 42.33; 427/200, 206, 462; 428/90

(56) References Cited

U.S. PATENT DOCUMENTS

| | | | | |
|---|---|---|---|---|
| 361,965 | * | 4/1887 | Mills .................................. | 43/42.25 |
| 1,640,599 | | 8/1927 | Conn .................................. | 229/92.9 |

(List continued on next page.)

FOREIGN PATENT DOCUMENTS

| | | | |
|---|---|---|---|
| 2617010 | * | 12/1988 | (FR) . |
| 2060331 | * | 5/1981 | (GB) . |
| WO 00/22922 | * | 4/2000 | (WO) . |

OTHER PUBLICATIONS

Maag, Ulrich, "Principles of Flocking", pp. 1–6, Reprinted from *Adhesives Age*, Sep. 1975, vol. 18, No. 9.

Borowski, Bob, "Get a Feel for Flocking," pp. 1–4, Reprinted from *Screen Printing*, Mar. 1998.

*Primary Examiner*—Darren W. Ark
(74) *Attorney, Agent, or Firm*—Workman, Nydegger & Seeley

(57) ABSTRACT

A fishing lure includes: (i) a hook; and (ii) a fishing lure substrate coupled to the hook. The fishing lure substrate includes: (A) a fishing lure substrate body having an outer surface; (B) a water insoluble adhesive layer on the outer surface; and (C) flocking fibers electrostatically deposited on adhesive layer. The fibers are affixed at one end by the adhesive layer to the substrate body. The opposing end of the flocking fibers extends away from the substrate body. The fibers are configured such that air is entrapped between intrafibral spaces. Methods for forming the fishing lure and a kit including a hook and a preflocked substrate configured to be selectively coupled to the hook are also disclosed.

37 Claims, 9 Drawing Sheets

U.S. PATENT DOCUMENTS

| | | | |
|---|---|---|---|
| 1,953,692 | 4/1934 | Shoff | 43/42.25 |
| 1,994,692 * | 3/1935 | Davenport | 43/42.27 |
| 2,018,622 | 10/1935 | Davenport | 43/42.53 |
| 2,038,940 | 4/1936 | Knill | 43/42.25 |
| 2,043,609 | 6/1936 | Derry, Sr. | 43/42.25 |
| 2,148,799 | 2/1939 | Bilinski | 43/42.53 |
| 2,621,104 * | 12/1952 | Prew | 428/90 |
| 2,636,837 * | 4/1953 | Summers | 428/90 |
| 2,775,055 * | 12/1956 | Waugh et al. | 43/42.25 |
| 2,841,804 * | 7/1958 | Case | 427/206 |
| 2,909,862 | 10/1959 | Minnite | 43/42.25 |
| 3,017,307 | 1/1962 | Halliburton | 156/72 |
| 3,079,722 * | 3/1963 | Greenlee | 43/42.25 |
| 3,495,350 | 2/1970 | Lievense | 43/42.25 |
| 3,629,050 * | 12/1971 | Weinstein | 428/90 |
| 3,757,452 | 9/1973 | Parker | 43/42.25 |
| 3,770,535 * | 11/1973 | Morrison | 428/90 |
| 3,856,598 * | 12/1974 | Gregorian et al. | 428/90 |
| 3,864,864 | 2/1975 | Duescher | 43/42.25 |
| 3,903,345 * | 9/1975 | Baker et al. | 428/90 |
| 4,133,134 * | 1/1979 | Cheng | 43/42.06 |
| 4,149,334 | 4/1979 | Rogers | 43/42.25 |
| 4,411,089 | 10/1983 | Runeric | 43/42.53 |
| 4,724,664 * | 2/1988 | Goerens | 427/462 |
| 4,738,046 * | 4/1988 | Fraylick et al. | 43/18.1 |
| 4,799,329 | 1/1989 | Paulsen | 43/42.28 |
| 4,829,695 * | 5/1989 | Hoecherl | 43/3 |
| 4,831,764 | 5/1989 | Jecevicus | 43/42.25 |
| 4,886,693 * | 12/1989 | Haranoya et al. | 428/90 |
| 4,887,378 | 12/1989 | Sheehan et al. | 43/42.25 |
| 4,908,975 | 3/1990 | Root et al. | 43/42.25 |
| 4,967,505 | 11/1990 | Wulff | 43/42.05 |
| 5,007,194 | 4/1991 | Coody | 43/42.29 |
| 5,027,543 | 7/1991 | Peterson | 43/42.25 |
| 5,065,541 | 11/1991 | Coody | 43/42.29 |
| 5,068,997 | 12/1991 | Shimazaki | 43/42.25 |
| 5,084,997 | 2/1992 | DiPaola | 43/42.53 |
| 5,119,583 | 6/1992 | Mason | 43/42.53 |
| 5,337,436 | 8/1994 | Saxer et al. | 15/104.94 |
| 5,618,588 * | 4/1997 | Alm | 427/462 |
| 5,693,360 * | 12/1997 | Stern et al. | 427/200 |
| 5,944,519 | 8/1999 | Griffiths | 433/80 |
| 6,049,934 | 4/2000 | Discko | 15/106 |
| 6,096,382 * | 8/2000 | Gueret | 427/462 |

* cited by examiner

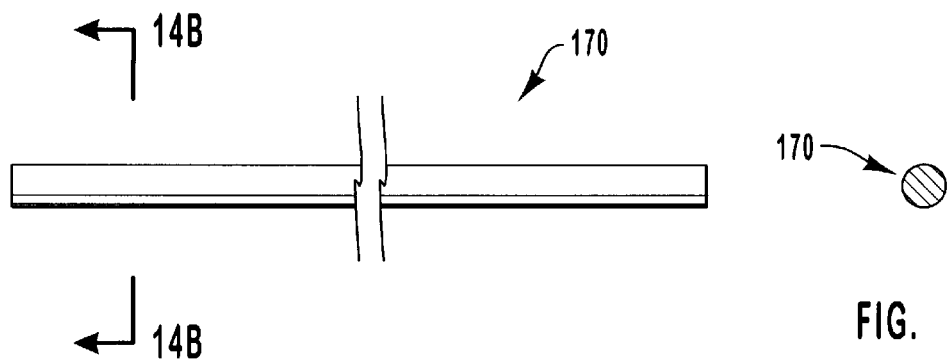
FIG. 14A
FIG. 14B
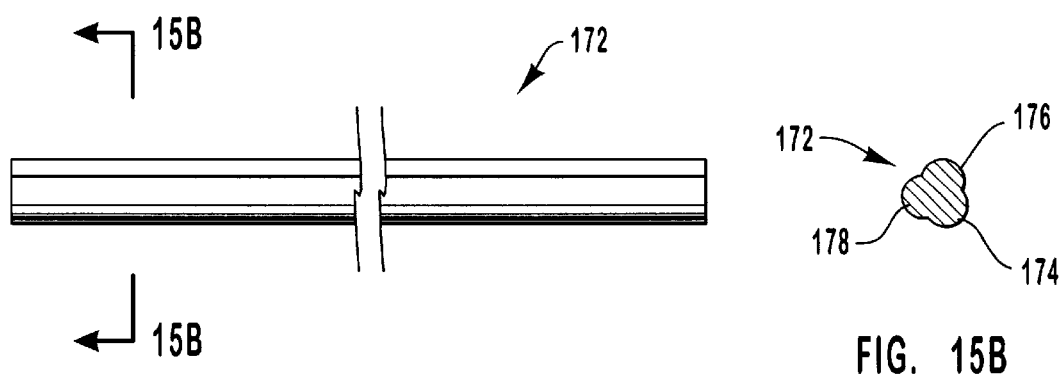
FIG. 15A
FIG. 15B
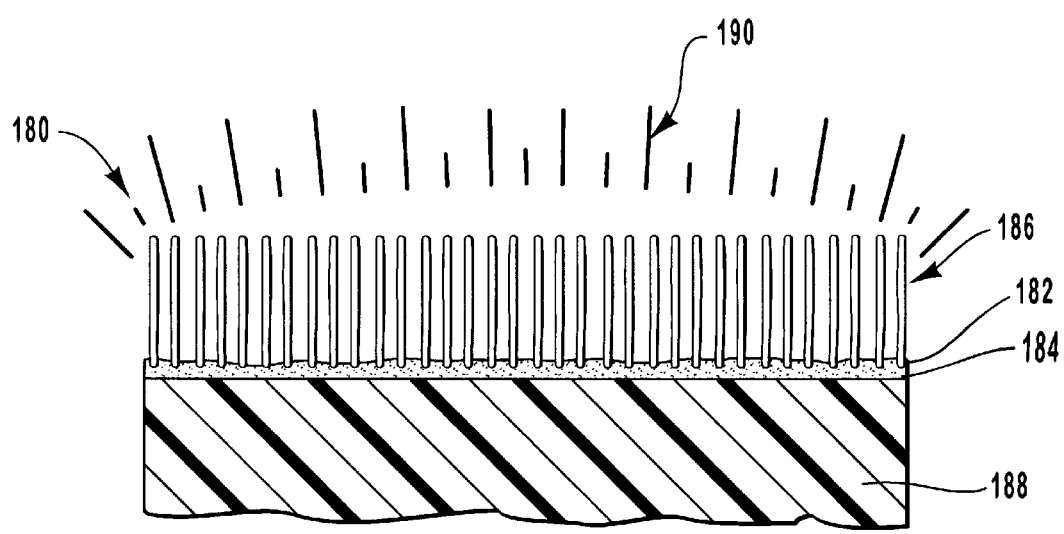
FIG. 16

ELECTROSTATICALLY FLOCKED FISHING LURES AND RELATED SYSTEMS AND METHODS

BACKGROUND OF THE INVENTION

1. The Field of the Invention

This application is directed to fishing tackle. More particularly, this application is directed to fishing lures having fibers thereon.

2. The Relevant Technology

Since ancient times, fishing has been relied on as a food source. In modern times, fishing remains a major food industry and has become popular as a sport and a means of recreation. Ancient records and archeological finds demonstrate that early anglers employed spears and hooks made from bone and wood in order to catch fish.

As time has progressed, the sophistication of fishing tackle has simultaneously evolved. Ancient hooks have evolved into sophisticated metal hooks with complex designs. Although use of natural bait, such as worms, salmon eggs, and cheese, is still a common form of catching fish, the use of artificial lures, including artificial flies and spinners has replaced many natural baits. Modern tackle and fly shops continually attract anglers anxious to find the bait, spinners and fly patterns which are most likely to catch large numbers and large sizes of fish.

The term "fishing lure," as employed in this specification and the appended claims relates to a vast array of fishing tackle including, by way of example, but not limited to, artificial flies, artificial spinners, artificial spoons, artificial bait (e.g., artificial simulations of fish, frogs, other amphibians, animals, insects, reptiles, salmon eggs, worms and other simulated food sources for fish), dry flies, wet flies, plugs, nymphs, streamers, hairwigs, fishing tackle commonly referred to as a "lure", and various additional objects having a hook and which are designed to stimulate the natural instinct of a fish to strike.

One feature of artificial lures which is typically employed to attract fish, particularly in flies and spinners, is the use of fibers. Such fibers include threads, feathers, and hair used to simulate wings, tails, legs, or other portions of an insect, fish, animal or other object. Such fibers are typically placed onto the substrate body of a spinner or fly through the use of manual fly tying or through mechanical methods. However, conventional devices and methods for creating fishing tackle with some degree of fibrous covering are tedious and complicated and typically fail to uniformly and densely coat a desired lure substrate body.

In addition to typical fishing lures having fibers thereon that are made by hand, others are made by sprinkling fibers onto an adhesive covered lure substrate body. In such gravity sprinkling, the fibers are deposited by being dropped onto a substrate body. Such gravity sprinkling tends to form flat, matted fibers. Varying portions of each individual fiber adhere to the substrate body. Furthermore, such fibers are typically not uniformly and densely deposited. Flat, matted fibers tend to inhibit the formation of dense fiber coatings. The central body portion of the fibers and/or both of the opposing ends of the fibers can become adhered to the substrate body. This can prevent other fibers from adhering to the substrate body. Moreover, sprinkling of fibers limits the process to preparing only one side or area at a time, since such sprinkling relies on gravity.

Some anglers have developed the ability to identify the feeding patterns of particular species of fish and/or the hatching patterns of particular insects. It is not uncommon for these anglers to initially examine the bank of a stream or river, such as by reviewing a sample of the soil on the bank. These anglers then determine the lure which is most likely to be successful (such as an artificial fly matching the flies which are hatching and floating on the surface of the stream) given the conditions of the stream or river that day.

Since fishing conditions can even change during the day, it is almost impossible to predict with perfect accuracy the fishing lure which will be the most successful for a particular fishing expedition at any given time. Consequently, anglers typically carry various fishing lures in their tackle box in anticipation of varying conditions.

Some anglers even carry the building materials for lures with them as they leave their vehicle and walk to a particular fishing hole. Some of these anglers examine the conditions of the fishing hole during that time of day, then tie a fly, for example, which is believed to be the most likely to be successful for them during that particular time of day.

The dedicated angler often enjoys the challenge and thrill of tying an appropriate fly while standing in slippery waders on the bank of a river. However, this already complicated process can be particularly difficult for the novice, anglers with arthritis, or those who have trouble seeing and handling small, delicate fibers. This process is further complicated by the necessary use of sharp, sometimes barbed, hooks intended to hook fish, but also able to snag the unwary angler.

Sometimes anglers do not know which lure they should use until they are in chest deep water wading in the middle of a rushing river. Typical anglers wear pocket-laden fishing vests with different lures in organized compartments in an attempt to avoid the often tortuous, slippery, and time consuming path back to a tackle box on the shore. However, it is not always possible to predict which lure to place in the vest and tying a particular fly in the middle of a rushing river is a challenge if not impossible even for experienced anglers. Such fly tying generally requires the use of a fly tying vise or other holder and a variety of different components and tools. Thus, wading anglers are typically limited to the lures already in their vest.

In addition, dry fly fisherman struggle in an effort to keep their artificial flies dry and floating on top of the water. Flies which become wet after a series of casts tend to sink, thus preventing the effect of a surface floating fly desired by the dry fly fisherman. In an attempt to keep their fly dry, dry fly fishermen apply a water repellant/floatation enhancing material to the fly or dry their fly using back and forth casting strokes outside of the water. However, the repellant typically wears off over continual uses and additional back and forth casting strokes takes time which could be otherwise used with the fly on the water and can result in frustrating snags on the shore.

There is therefore a need in the art for fiber-coated fishing lures which are convenient to manufacture and use and which effectively stimulate the natural instincts of fish to strike. There is also a need in the art to enable an angler to conveniently and efficiently form a selected fiber-coated fishing lure within a moment's notice.

SUMMARY AND OBJECTS OF THE INVENTION

It is therefore an object of the invention to provide fiber-coated fishing lures which are convenient to manufacture.

It is another object of the invention to provide fiber-coated fishing lures which effectively stimulate the natural instincts of fish to strike.

It is another object of the invention to provide densely and uniformly fiber-coated fishing lures.

It is another object of the invention to provide fiber-coated fishing lures having fibers which entrap air.

It is another object of the invention to provide convenient, efficient, and effective methods for manufacturing fiber-coated fishing lures.

It is another object of the invention to provide a kit comprising fiber-coated lure components which can be conveniently assembled upon a moment's notice and without requiring cumbersome assembly equipment.

A fishing lure of the present invention comprises a fishing lure substrate configured to stimulate the instinct of a fish to strike. One such fishing lure substrate comprises: (A) a fishing lure substrate body; (B) an adhesive layer formed on at least a portion of the outer surface of the substrate body; and (C) flocking fibers electrostatically deposited on the adhesive layer. The fibers are affixed at an adhesion end thereof to the substrate body. The opposing free ends of the flocking fibers extend away from the substrate body.

The substrate can be electrostatically flocked and coupled to a hook or electrostatically flocked and configured to be selectively coupled to the hook. The hook itself can optionally be flocked to form the electrostatically flocked substrate of the present invention.

Thus, the phrase "fishing lure substrate" as used throughout this specification and the appended claims refers to: (i) a hook which is electrostatically flocked; (ii) an object which is electrostatically flocked and is coupled to a hook; or (iii) an object which is electrostatically flocked and is configured to be selectively coupled to a hook.

The electrostatically flocked fishing lure has a variety of different advantages. First, the flocking fibers are applied in a dense, uniform manner. Consequently, the fibers are substantially parallel to each other and extend away from the substrate body.

The dense, parallel nature of the fibers enhances the formation of air pockets between fibers. The fibers are not matted down on top of each other. The formation of air pockets between adjacent fibers promotes the buoyancy of the lure. The air pockets also enable an attractant (such as a scent, for example) and/or a buoyancy enhancing material to be deposited on the fibers. Furthermore, the entrapment of air gives the flocked fishing lure a more natural appearance, which can stimulate a fish to strike.

By applying fibers of different lengths, the appearance and texture can be varied. Furthermore, the longer fibers are supported by shorter fibers, preventing the matting of the fibers. The use of fibers of varying length can also assist in the formation of air pockets for the entrapment of air.

A variety of different lures may be formed in accordance with the present invention. The electrostatic flocking method of the present invention is useful on any fishing lure which employs fibers on the lure.

In one embodiment, a lure substrate of the present invention employs a luminescent, (e.g., phosphorescent) material in the adhesive layer thereof to form a unique glow-in-the-dark dynamic. The substrate body and/or adhesive layer can be flexible or rigid, as desired by a particular angler.

By preparing a kit having a variety of different hooks and preflocked lure substrates, practitioner can readily build a desired lure as necessary within a moment's notice while sitting in a rocking drift boat, squatting in a brush-laden embankment, or while wading in the middle of a torrential river adjacent a favorite fishing hole.

According to one technique, the step of forming an adhesive layer comprises depositing a water insoluble adhesive on the outer surface of the substrate body. According to another technique, the adhesive layer is formed by depositing a solvent on at least a portion of the outer surface of the substrate body which results in the formation of an adhesive layer. Fibers can then be adhered to the resulting adhesive layer.

These and other objects, features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings listed hereinbelow.

FIG. 14a demonstrates a flocking fiber of the present invention.

FIG. 14b is a cross sectional view of the flocking fiber of FIG. 14.

FIG. 15a demonstrates a flocking fiber of the present invention.

FIG. 15b is a cross sectional view of the flocking fiber of FIG. 15.

FIG. 16 is a schematic, cross-sectional representation of a fishing lure substrate of the present invention having a luminescent material in the adhesive layer thereof.

DETAILED DESCRIPTION OF THE PREFERRED EMBODIMENTS

Figure 1:
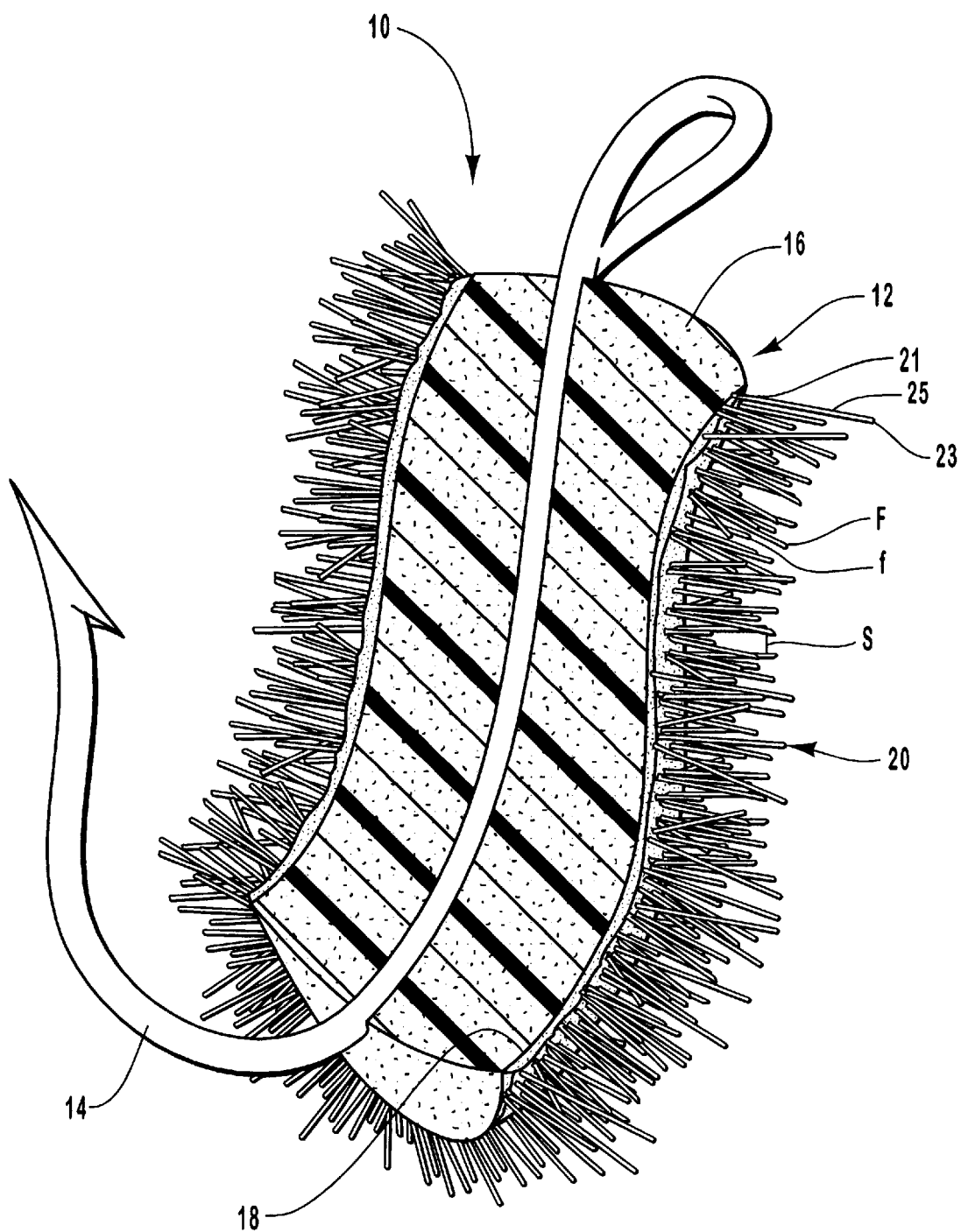
FIG. 1 is a cross-sectional representation of a fishing lure of the present invention.

With reference now to FIG. 1, a schematic representation of a fishing lure 10 of the present invention is shown in a cutaway view. Fishing lure 10 comprises a fishing lure substrate 12 coupled to a fishing hook 14. In the embodiment of FIG. 1, fishing lure substrate 12 comprises (i) a substrate body 16; (ii) an adhesive layer 18 formed on substrate body 16; and (iii) a plurality of flocking fibers 20 electrostatically deposited onto adhesive layer 18.

Electrostatically flocked fishing lure 10 has a variety of unique advantages. First, by electrostatically flocking substrate body 16, flocking fibers 20 are applied in a uniform manner substantially perpendicular to their adhesion site on the substrate body 16. Fibers 20 are affixed at an adhesion end 21 thereof by adhesive 18 to substrate body 16 while the opposing free ends 23 thereof extend away from substrate body 16. Consequently, fibers 20 are substantially parallel to each other. Such substantially parallel fibers can be applied more densely because the central portions 25 and free ends 23 thereof are not tangled or adhered adjacent substrate body 16. Since only the adhesion ends 21 are adhered to the substrate body, the coating may be densely and uniformly formed.

The parallel nature of fibers 20 enhances the formation of air pockets in spaces "S" (FIG. 1) between fibers, as opposed to fibers which are matted down on top of each other. The formation of air pockets in these intrafibral spaces "S" is one major advantage of lure 10. The formation of air pockets promotes the buoyancy of lure 10.

Naturally, heavy lures which have been electrostatically flocked do not necessarily float. Nevertheless, the densely, uniformly applied fibers have enhanced aesthetic and natural appeal for all lures. The ability to appear more life-like can include the ability to trap air between fibers. The ability to hold attractants (such as scents) and water repellant is also enhanced by the formation of air pockets in intrafibral spaces "S".

Furthermore, uniformity about the entire circumference of a lure substrate is achieved through electrostatic flocking, as opposed to sprinkling onto merely one side of the substrate body 16. This uniformity of application can enhance the attractiveness of lure 10 to fish. Fibers 20 exhibit a natural and appealing appearance which stimulates the natural instinct of a fish to strike. In addition, electrostatically flocked lure 10 can be formed in a convenient and efficient manner.

As another advantage of the present invention, it is possible to flock different sizes of fibers substantially parallel to each other such that the shorter fibers "f" (FIG. 1), which tend to have more rigidity than longer fibers "F", tend to hold up the longer fibers "F" and prevent longer fibers "F" from drooping or matting. These short fibers "f" prop up the long fibers "F" and prevent the matting thereof. The long and short fibers may have the same color, a different color, or mixed colors.

The relative concentrations of short and long fibers may be in a variety of different ranges. Furthermore, multiple sizes of fibers can be employed e.g., two different sizes, three different sizes, four different sizes and so on depending upon a desired appearance, texture, and body, among other factors. Thus, a variety of different sizes of fibers may be larger or smaller than a given fiber.

In one embodiment, about 1% to about 99% of the fibers electrostatically deposited on the substrate body are shorter than the remainder of the fibers electrostatically deposited on the substrate body. In another embodiment, about 25% to about 75% of the fibers electrostatically deposited on the substrate body are shorter than the remainder of the fibers electrostatically deposited on the substrate body. In another embodiment, about 35% to about 65% of the fibers electrostatically deposited on the substrate body are shorter than the remainder of the fibers electrostatically deposited on the substrate body. In one embodiment, at least about half of the fibers electrostatically deposited are shorter than the other fibers electrostatically deposited.

The use of fibers having different lengths can provide body to the appearance of the substrate, causing the fiber application to look more substantial, can hold attractants such as scents, and can promote buoyancy and other dynamics. The use of shorter and longer fibers can also enhance air entrapment and retention of fluids and other materials.

In the present invention, the lure substrate is formed at least partially through the use of electrostatic flocking. Different portions of the lure substrate may be hand tied or coated through gravity sprinkling or in another manner, depending upon the desired appearance for a particular lure.

A variety of different lures may be formed having electrostatically deposited fibers thereon. The electrostatic flocking method is useful for any fishing lure which employs a plurality of fibers on the lure.

Substrate 12 is depicted in FIG. 1 as a flocked body which has a fishing hook 14 coupled thereto. However, a fishing lure substrate may be any object which is employed to attract fish. For example, in another embodiment, the fishing lure substrate comprises a hook which has been flocked according to the present invention. In another embodiment, the fishing lure substrate comprises any portion of an artificial fly, spinner, spoon, artificial bait or other lure which has been electrostatically flocked, such as a body, ribbing, joint, hackle, head, shoulder, cheek, topping, wing, veil, tail, tip, butt, spines, hair, fins, other projections, hook shank, hook bend, blade, spoon, or other object designed to attract fish. The fishing lure substrate of the present invention may have a variety of different designs, shapes, and combinations.

Figure 6A:
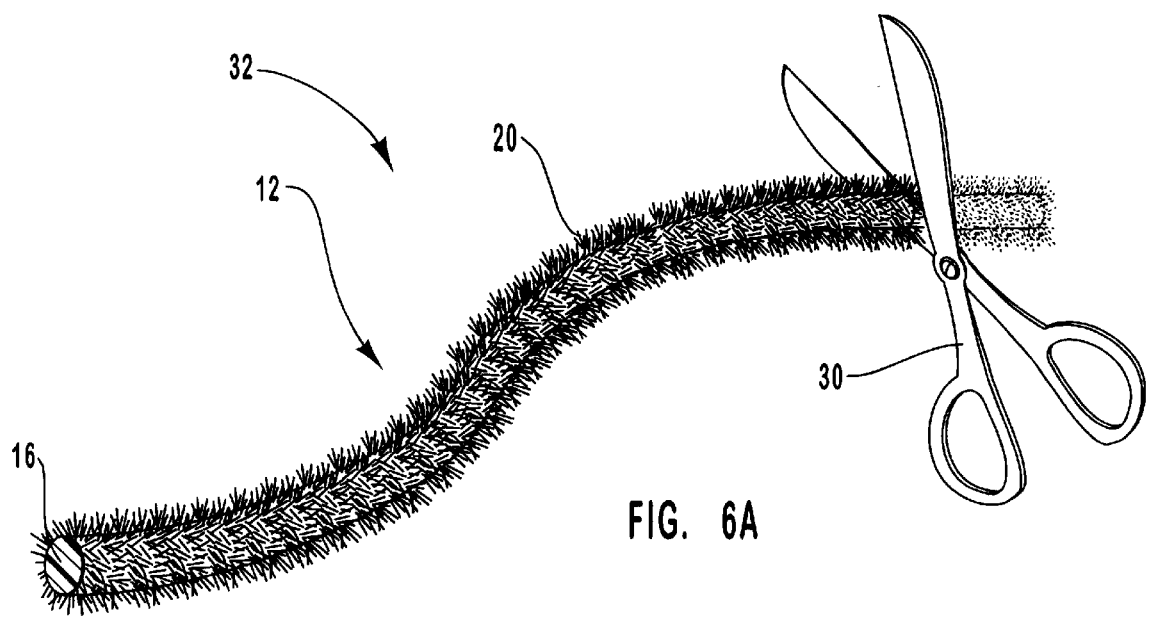
FIG. 6A is a representation of a manually separable lure substrate from which a smaller lure substrate is being cut.
Figure 6B:
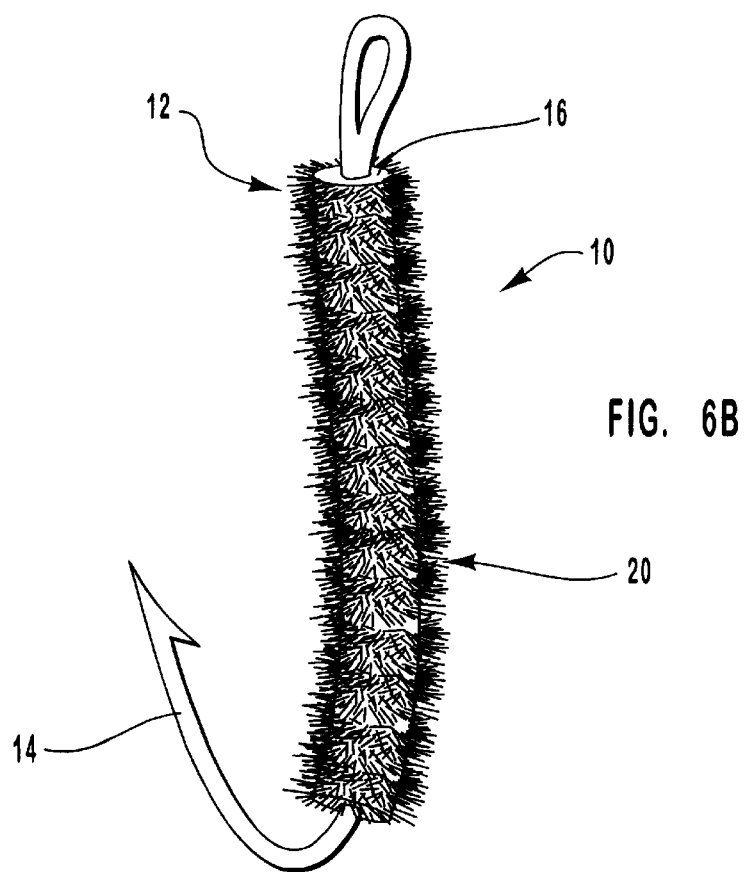
FIG. 6B is a perspective view of the fishing lure of FIG. 1 comprising a lure substrate separated from the larger lure substrate of FIG. 6A and coupled to a fishing hook.
Figure 7A:
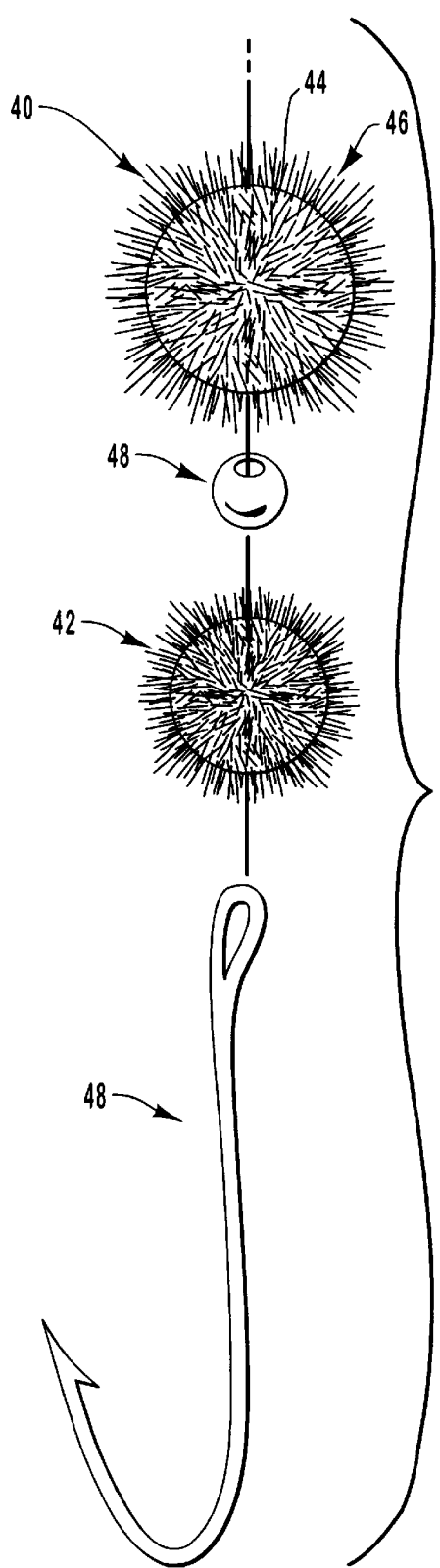
FIG. 7A is a representation of first and second flocked lure substrates and a bead of the present invention exploded above a hook.
Figure 7B:
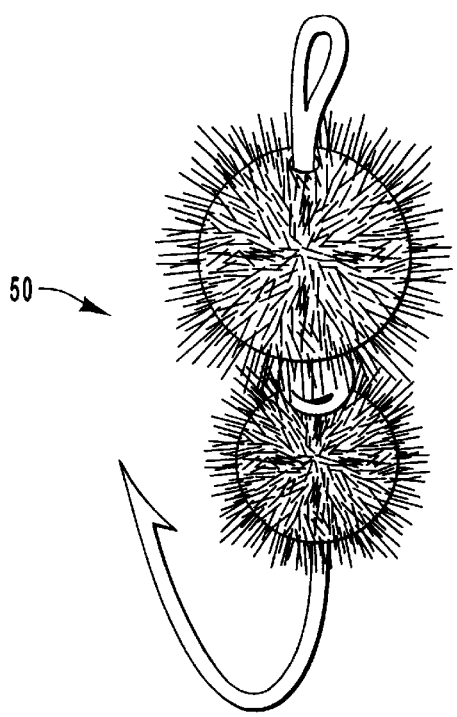
FIG. 7B is a representation of the components shown in FIG. 7A in an assembled view to form a fishing lure.
Figure 7C:
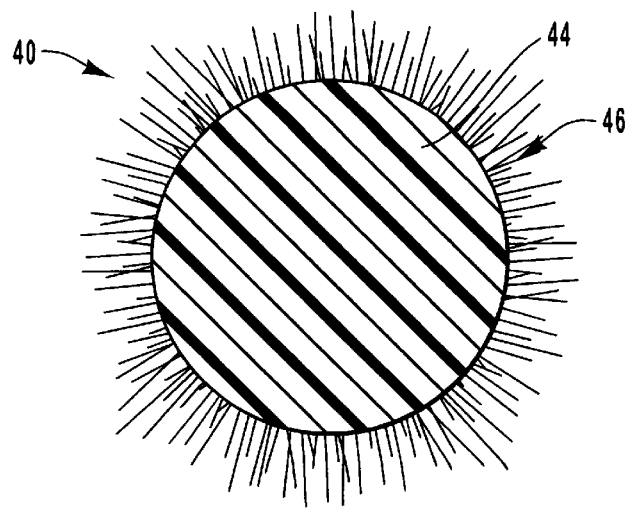
FIG. 7C is a cross sectional representation of a flocked substrate of FIG. 7A.
Figure 8A:
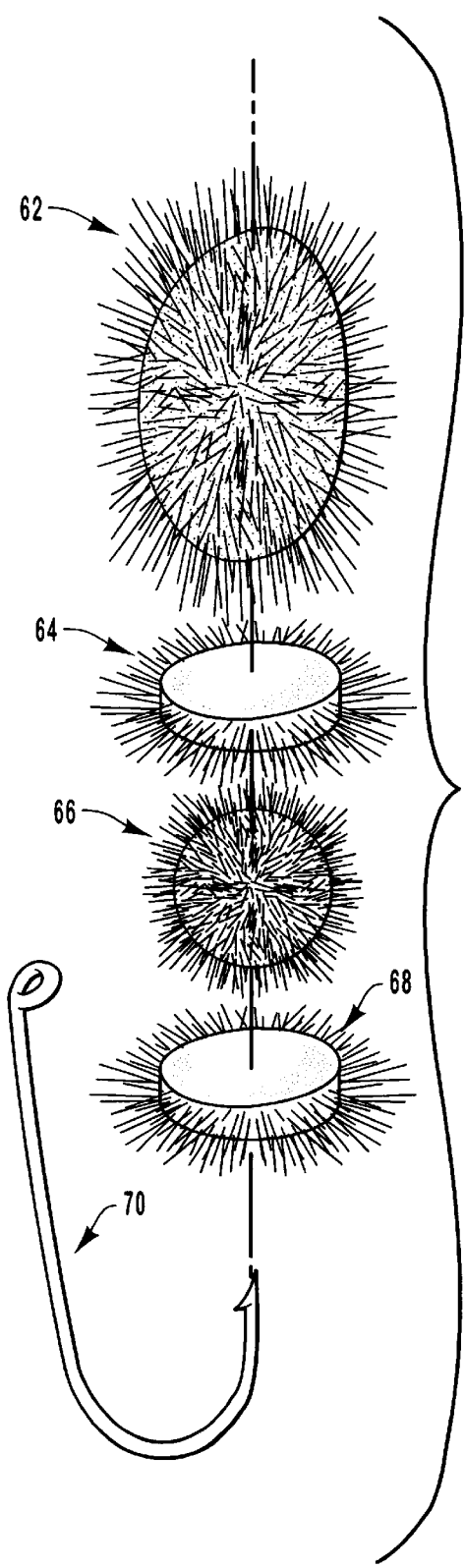
FIG. 8A is a representation of a plurality of flocked lure substrates of the present invention exploded above a hook.
Figure 8B:
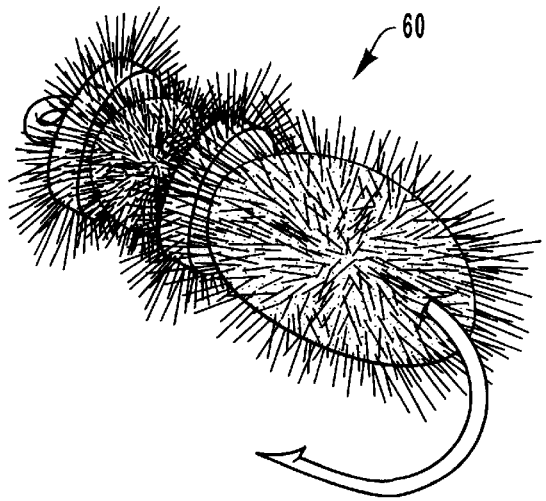
FIG. 8B is a representation of a lure of the present invention comprising the components of FIG. 8A assembled to form a fishing lure.

FIGS. 2–5 depict an example of an electrostatic flocking method which may be employed in the present invention. FIGS. 6A–6B, 7A–7C, and 8–12 demonstrate examples of lures flocked through electrostatic flocking in accordance with the present invention. FIGS. 6A–6B depict elongate flocked substrates which are selectively, manually separable, such as through cutting or tearing, and configured to be coupled to a fishhook. FIGS. 7A–7C depict round, flocked substrates. FIGS. 8A–8B depict multi-shaped substrates and FIGS. 8–12 depict flocked substrates and resultant lures having a variety of different shapes and combinations.

Figure 13:
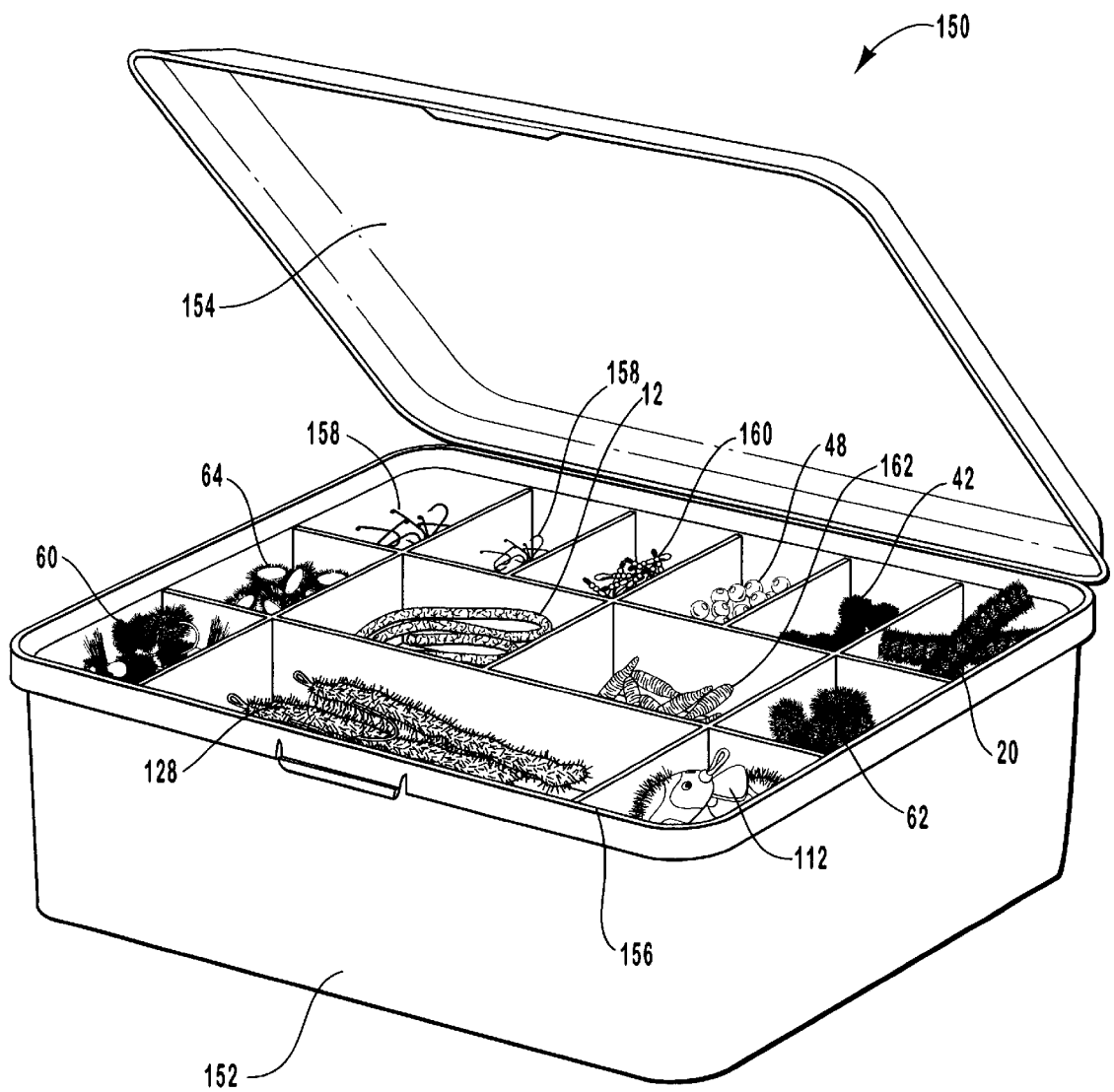
FIG. 13 demonstrates a kit of the present invention.

FIG. 13 demonstrates an example of a kit of the present invention. FIGS. 14–15 demonstrate examples of fibers of the present invention. FIG. 16 demonstrates another example of a lure substrate of the present invention employing a luminescent material, such as a phosphorescent pigment in the adhesive layer thereof to form a unique glow-in-the dark dynamic. The lures depicted are only examples of possible lures which may be employed in the present invention.

With reference now to FIGS. 2–5, a schematic representation of a method for electrostatically flocking a fishing lure substrate 12 of the present invention is depicted. A variety of other electrostatic flocking methods are available. The methods of FIGS. 2–5 are thus only provided for purposes of illustrating possible methods of electrostatic flocking.

Figure 2:
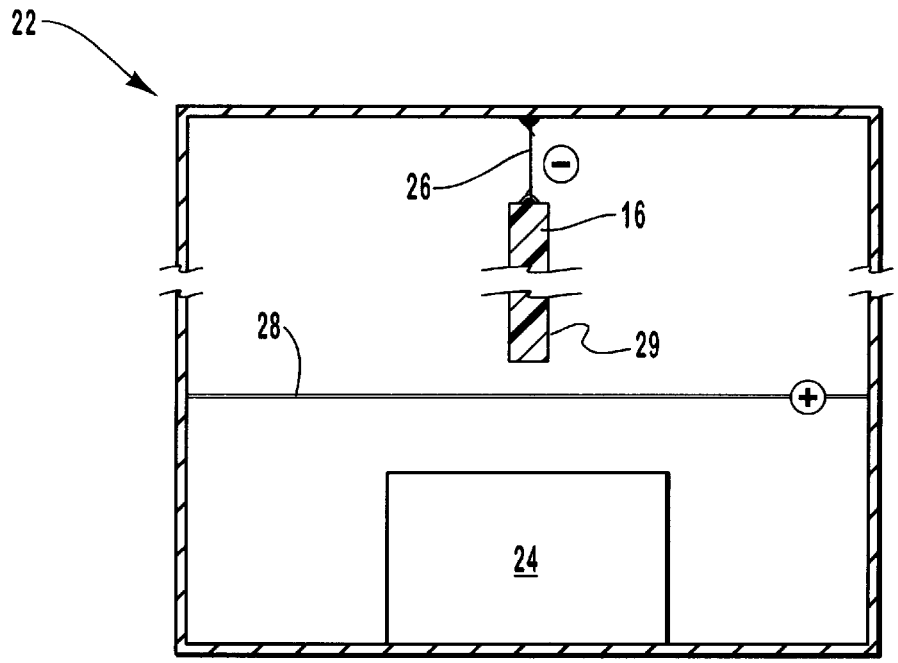
FIG. 2 is a schematic representation of a flocking chamber holding a substrate therein.

FIG. 2 depicts a flocking chamber 22. Flocking chamber 22 has a source 24 of flocking fibers and a flocking lure substrate holder 26. Flocking chamber 22 further has a negative electrode, which can be integral with or coupled to substrate holder 26, and a positive electrode represented at 28. Negatively charged substrate holder 26 selectively holds a substrate body 16 within flocking chamber 22 such that substrate body 16 is subject to the positive and negative charges. Substrate body 16 has an outer surface 29.

Figure 3:
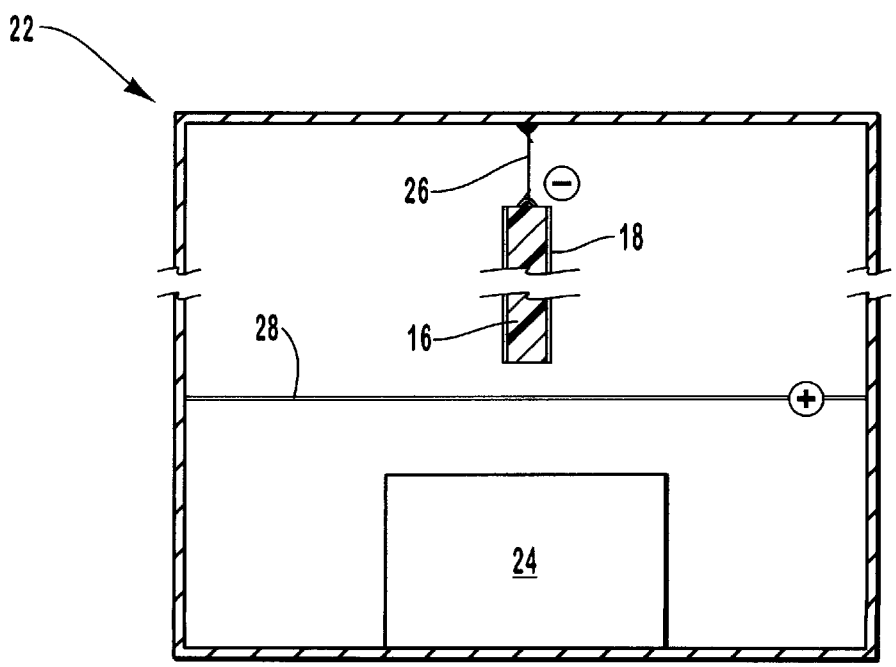
FIG. 3 is a schematic representation of the flocking chamber of FIG. 2, wherein the substrate has an adhesive layer thereon.

As represented in FIG. 3, in order to cause fibers to adhere to substrate body 14, an adhesive layer 18 is formed, such as through deposition of an adhesive or a solvent onto outer surface 29 of substrate body 16. FIG. 3 depicts substrate body 14 having an adhesive layer 18 on the outer surface 29 thereof The adhesive layer 18 is formed on at least a portion of outer surface 29 of substrate body 16, depending on the amount of fiber coating which is desired. That portion of substrate body 16 which has an adhesive layer thereon will receive fibers thereon such that the fibers adhere to substrate body 16. However, portions of substrate body 16 lacking an adhesive layer will not have fibers adhered thereto.

Figure 4:
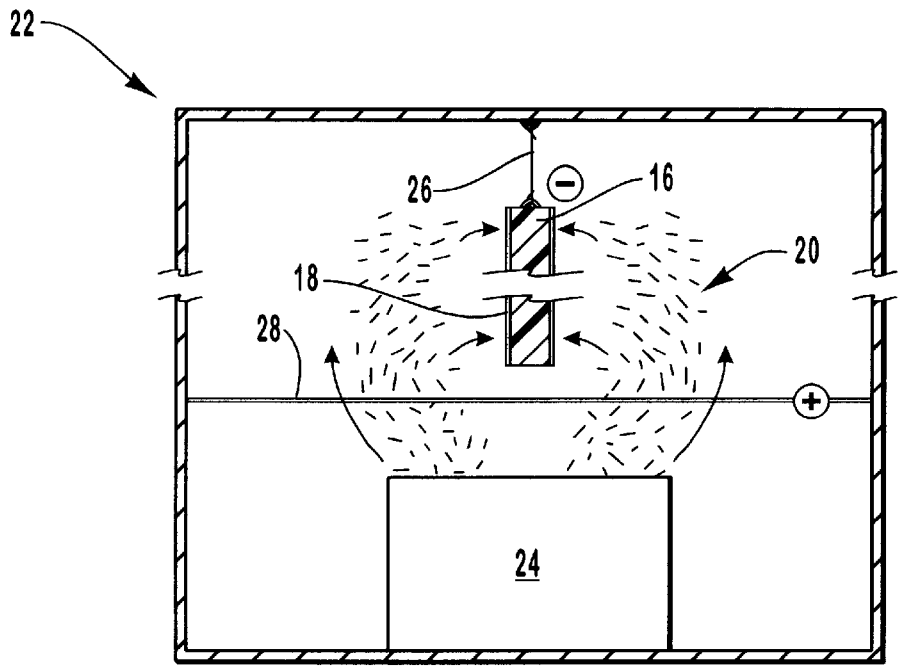
FIG. 4 is a schematic representation of the flocking chamber of FIGS. 2 and 3 with flocking material being applied electrostatically to the adhesion-covered substrate.

With reference now to FIG. 4, a schematic depiction of the electrostatic deposition of fibers 20 onto adhesive layer 18 is shown. One skilled in the art will appreciate that FIG. 4 depicts a technique known as "up flocking". However, a variety of different methods for electrostatically depositing a plurality of fibers to outer surface 29 of substrate body 16 may be employed in the present invention such that the free ends of fibers 20 extends away from substrate body 16. Such alternative methods include down flocking, side flocking, flocking at an angle, or a variety of different electrostatic flocking methods.

In one embodiment of electrostatic flocking, an electrostatic charge is actuated within flocking chamber 22 and fibers 20 are delivered to substrate 16 from fiber source 24. The adhesive is then allowed to harden, adhering fibers 20 to substrate 16. By depositing fibers 20 in an electrostatically charged environment, the fibers can be applied in a uniform nature such that air pockets can form between the fibers.

Figure 5:
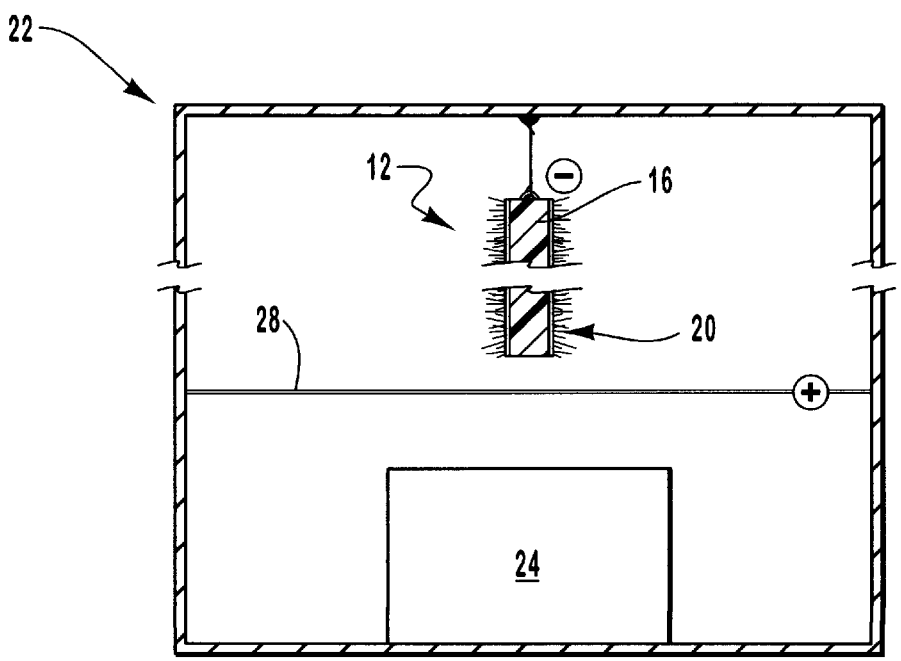
FIG. 5 is a schematic representation of the flocking chamber of FIGS. 2–4 with the flocking material shown as having been applied to the adhesion-covered substrate.

FIG. 5 depicts substrate 12 with electrostatically deposited fibers on the outer surface thereof. Fibers 20 are affixed at their adhesive ends by an adhesive layer to substrate body 16. The opposing free ends of flocking fibers 20 extend away from substrate body 16. Thus, fibers 20 applied through the electrostatic flocking method of the present invention are substantially perpendicular to their adhesion site on substrate 12 as shown in FIG. 5.

The substrate bodies of the present invention may be formed from organic and inorganic materials, metals, ceramics, wood, plastics, a rigid material such as a rigid plastic, a flexible material such as a flexible plastic or rubber, a thermoplastic elastomer, or a variety of different materials. Material for substrate bodies of the present invention, such as body 16, may comprise plastisol, neoprene, polypropylene, polyethylene, polycarbonate, acyrlic, or a variety of other materials which are suitable for coupling to a fishhook. While certain substrate bodies are preferably rigid, substrate body 16 of FIGS. 1, 6A and 6B is preferably comprised of a flexible, manually separable material.

With reference now to FIGS. 6A and 6B, electrostatically flocked substrate 12 is shown in unmounted and mounted views, respectively. Substrate 12 comprises an elongate body in the form of a worm, for example. Substrate 12 is comprised of a separable material, such as a tearable or cutable material. As shown, portions of substrate 12 can be pinched off or optionally, a scissor 30 or other cutting means may be employed to selectively separate substrate 12 from a larger overall substrate 32, such that a practitioner can selectively determine how much of a particular substrate 32 to employ in a particular setting.

As shown in FIG. 6B, upon separation, substrate body 16 is selectively punctured by a fishing hook 14 in order to thereby couple substrate body 16 to fishing hook 14 to form lure 10.

It is also possible to form round, flocked substrates, such as substrates 40, 42 of FIGS. 7A and 7B. Each substrate comprises a substrate body 44, an adhesive layer, and a plurality of fibers 46 coupled to the substrate body 44 by the adhesive layer. A hollow, nonflocked bead 48 or other member may be sandwiched between, or otherwise placed adjacent substrates 40, 42, each of which can then be coupled to a fishing hook 48 to form a fishing lure 50, as depicted in FIG. 7B. Substrates 40, 42 and bead 48 are examples of modular components which can be placed in a variety of different configurations on hook 48.

The various components of lure 50, shown in FIGS. 7A and 7B form a kit conveniently carried by the angler. In light of the various possible configurations of different flocked and nonflocked substrates, it is possible for an angler to build a variety of different lures from a kit of the present invention.

FIGS. 8A–8B demonstrate another example of a kit of the present invention employed to selectively form a fishing lure 60. Lure 60 can be formed through a variety of different substrates 62, 64, 66, 68, and a fishing hook 70. Lure 60 can have a variety of different configurations and combinations, only one of which is shown. One or more of substrates 62, 64, 66, 68 can be placed on hook 70 in a number of different sequences. These different configurations can be selected for a particular dynamic desired by an angler. The selection of which substrates to use and in which combination to use them can be made at any time by the angler, even if the angler is in chest deep water, for example. Substrates 62–68 can be selectively coupled to a fishing hook 70 such as by impaling the substrates onto the hook.

Figure 8C:
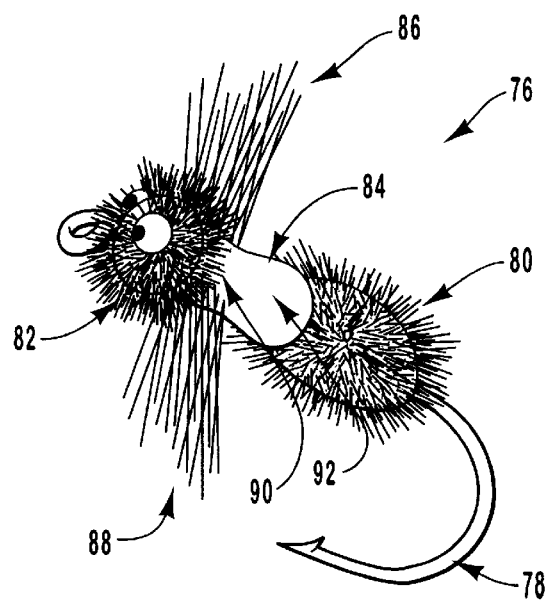
FIG. 8C is a representation of an alternative fishing lure comprising a plurality of flocked components.

An alternate fishing lure 76 is depicted in FIG. 8C. Fishing lure 76 comprises a fishing hook 78, a tail portion 80, a head portion 82, a mid section 84 and wings 86, 88 extending from opposing sides of mid section 84. Fishing lure 76 may be formed in separate pieces, then built as desired by the practitioner or may be formed as a single unitary piece by placing adhesive in the desired places, then flocking the underlying substrate body such that the flocking material adheres to the portions where the adhesive was placed. For example, by placing adhesive on the wing portion 90 of mid section 84, wings 86, 88 form during the flocking. By leaving unflocked portion 92 of mid section 84 without adhesive thereon no wings or other structures form during the flocking procedure of mid section 84.

Figure 9A:
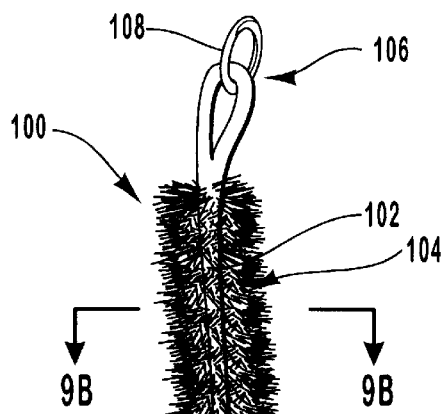
FIG. 9A is a representation of a flocked lure of the present invention comprising a hook having flocking material electrostatically deposited thereon.
Figure 9B:
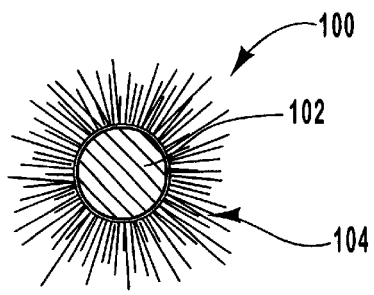
FIG. 9B is a cross sectional representation of the lure of FIG. 9A.
Figure 10:
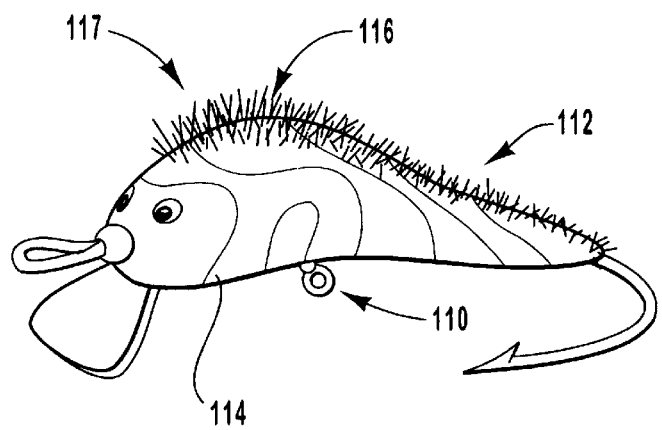
FIG. 10 is a representation of another flocked lure of the present invention.
Figure 11:
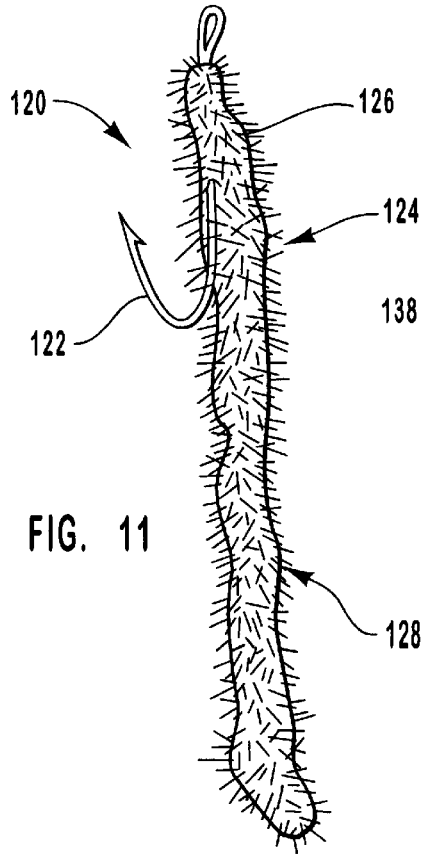
FIG. 11 is a representation of another flocked lure of the present invention.

FIGS. 9A and 9B depict yet another fishing lure 100 of the present invention which comprises a substrate body 102 in the form of hook 102 and fibers 104 coupled thereto through the use of an adhesive deposited on the hook. Hook 102 comprises an eyelet 106. In the embodiment shown, a split coupling ring 108 is coupled to eyelet 106. Ring 108 is an example of means for selectively coupling hook 102 to a lure substrate, such as substrate 117 of FIG. 10. Other examples of such coupling means comprise clips, wires, cables, ties, snaps, swivels, fasteners, clasps, and a wide variety of attaching members.

Coupling ring 108 may be selectively coupled to lure substrates such as by coupling to the ring 110 of lure 112 (FIG. 10), a spoon blade, a spinner body, or to another portion of a lure substrate. Hook 102 can be used to replace a non-flocked hook with a flocked hook, for example, in order to provide the advantages of substantially parallel flocking to a lure substrate. For example, it may be advantageous to add a flocked hook to an otherwise nonflocked substrate in order to provide surface area and air pockets for placement of a scent or buoyancy enhancing material therein or to enhance the attractiveness of the substrate to fish.

Lure 112 comprises a fish-like lure having a rigid substrate body 114 and flocking material 116 deposited on substrate body 114 through electrostatic flocking to form substrate 117. Fishing lure 120 of FIG. 11 features a hook 122 coupled to a lure substrate 124 which has a lure substrate body 126 and fibers 128 thereon.

Figure 12:
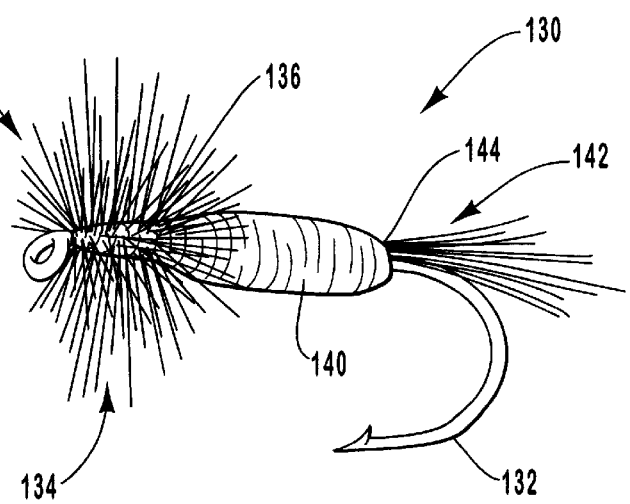
FIG. 12 is a representation of another flocked lure of the present invention.

As shown in FIG. 12, another embodiment of a lure 130 comprises an artificial fly 130 including a fishing hook 132 and a variety of different lure substrates coupled thereto. One lure substrate comprises a neck 134 comprising a substrate body 136 and fibers 138 deposited electrostatically thereon. A second substrate of lure 130 comprises body 140 having tail section fibers 142 coupled thereto.

Fibers 142 may be placed on body 140 in a variety of different manners such as through electrostatic flocking in which an adhesive is only placed on the proximal end 144 after which the proximal end 144 is electrostatically flocked. In another embodiment, however, fibers 142 are attached by hand or another method.

FIG. 13 demonstrates another embodiment of a kit 150 of the present invention. Kit 150 comprises a container 152 having a lid 154 movably coupled thereto. Container 152 has a variety of different compartments 156 for storing a variety of different hooks 158 and a variety of other components. Examples of such additional components in kit 150 include (i) flocked lures 112; (ii) flocked lures 60, 120 which are selectively disassembled and rearranged; (iii) unflocked substrate bodies 12, 160, 48; and (iv) flocked substrates 64, 42, 62, 20.

The substrates of kit 150 are configured to be selectively, manually coupled to fishing hooks 158 of kit 150 to form a variety of different desired configurations, only some of which are depicted herein. The substrates are modular such that they can be used in a variety of different combinations. The coupling of substrates of kit 150 to the hooks thereof may be achieved in a variety of different manners, such as by configuring the substrate body thereof from an elastomeric material which is selectively punctured by the hooks such that the hooks remain in the substrate and retain the substrate thereon.

By providing a variety of different hooks and lure substrates, a practitioner can readily employ flocked substrates in a desired combination even in the most difficult of circumstances such as when an angler is wading through a river or stream. Because of the configuration of kit 150, it is possible for an angler to manually assemble a fishing lure having a selected size, shape and configuration of components without having to hand tie each portion of a fly, spinner, or other lure. Nevertheless, the angler has the advantages of a flocked lure. Water repellents and attractants such as scents may also be included in the kit, as desired. It is envisioned that an angler would carry container 150 in order to enable the angler to build a desired fly or other lure at a moment's notice.

A variety of different flocking fibers may be employed in the present invention having a variety of different shapes, diameters, and sizes. As one example, in FIGS. 14A and 14B, fibers 170 are shown. Fibers 170 have a substantially circular cross section.

In another embodiment fibers having bilobal or trilobal cross sections are employed. A variety of different shapes for the cross sections of the fibers are available, such as octagonal cross sections, hexagonal cross sections, triangular cross sections, and square cross sections. In the trilobal and dilobal shapes, a smaller diameter fiber can be employed in place of a larger diameter fiber, and yet have the same stiffness For example, as shown in FIGS. 15B and 15B, fibers 172 may have a variety of different cross sectional shapes such as trilobal shapes which increase the rigidity of the fibers. A smaller diameter trilobal fiber 172 may be employed in the place of a large diameter circular fiber 170, yet have the same amount of rigidity as the larger diameter fiber. The separate lobes 174, 176, and 178 of the trilobal-shaped fiber thus provide rigidity and stability to fiber 172.

Flocking fibers 170, 172 are preferably coated electrostatic flocking fibers, enhancing the ability of the fibers to receive and respond to an electrical charge (such as AC or DC coated flocking fibers).

Flocking fibers of the present invention may be comprised of a variety of different materials, including nylon, neoprene, rayon, synthetic polyester, DACRON®, wood fibers, or natural polyester, a unique and novel flocking material. Flocking fibers of the present invention can also have a variety of different colors including green, blue, red, pink, yellow florescent-type colors, black, and a variety of other colors which are useful for catching fish.

Depending upon the desired embodiment, the length of flocking fibers employed in the present invention may be in the range of about 0.005 inch to about 3 inches, about 0.01 inch to about 1 inch, or about 0.05 inch to about 0.25 inch, for example. However, a variety of different lengths of fibers may be employed and such ranges are provided only by way of example. One preferred length is about 0.25 inches long.

Depending upon the desired embodiment, the diameter of flocking fibers employed in the present invention may be in the range of about 1 denier to about 0.05 inch, about 3 denier to about 0.025 inch, or about 6 denier to about 20 denier, for example, although a variety of diameters are available. For example, in one embodiment, the fibers are about 1 inch long by about 20 denier. Fibers of the same or different length may vary in diameter to achieve different effects.

As mentioned above, it is possible to electrostatically deposit fibers having different lengths and different diameters to achieve a desired effect. In one embodiment, the length of some of the fibers electrostatically deposited is about 1.1 to about 20 times the length of other fibers electrostatically deposited. In another embodiment, the length of some of the fibers electrostatically deposited is about 1.5 to about 10 times the length of other fibers electrostatically deposited. In another embodiment, the length of some of the fibers electrostatically deposited is about 1.1 to about 5 times the length of other fibers electrostatically deposited. In another embodiment, the length of some of the fibers electrostatically deposited is about 2 to about 5 times the length of other fibers electrostatically deposited.

The diameter of different fibers can vary as well. In one embodiment, the diameter of some of the fibers electrostatically deposited is about 1.1 to about 20 times the diameter of other fibers electrostatically deposited. In another embodiment, the diameter of some of the fibers electrostatically deposited is about 1.5 to about 10 times the diameter of other fibers electrostatically deposited. In another embodiment, the diameter of some of the fibers electrostatically deposited is about 1.1 to about 5 times the diameter of other fibers electrostatically deposited. In another embodiment, the diameter of some of the fibers electrostatically deposited is about 2 to about 5 times the diameter of other fibers electrostatically deposited.

In addition to electrostatic flocking, fibers may be deposited without electrostatic flocking. It may be possible to adhere certain fibers by hand, by sprinkling, or by blowing them onto a substrate body with air onto an adhesive for example. Certain fibers may be employed which are parallel to a lure substrate body, for example, to achieve a certain desired dynamic.

FIG. 16 is a representation of a fishing lure substrate 180 having an adhesive layer 182 comprising a luminescent material such as a phosphorescent pigment 184. Adhesive layer 182 attaches fibers 186 to lure substrate body 188. As a result, lure substrate 180 has a glow-in-the-dark adhesive layer 184. The glow from pigment 184 extends along fibers 186 and emanates a glow 190 out of the fibers. This attracts fish because of the glow thereof and also because of the brightness of lure substrate 180. The luminescent material can also make lure 180 appear larger than it actually is, enabling the fish to see the lure better. The amount of luminescent material to be placed in the adhesive or in the substrate bodies depends upon the amount of glow desired by a particular angler.

In one embodiment, the luminescent material employed for the glow-in-the-dark effect comprises a powder in the form of zinc sulfide copper-doped phosphorous pigment. The use of a luminescent material directly in the adhesive is a unique and novel contribution to the art of fishing lures. In one embodiment, the luminescent material is mixed with the adhesive before the deposition of the adhesive on the substrate body. The luminescent material may also be added to a previously applied adhesion layer before the hardening thereof on the substrate.

According to one technique, the step of forming an adhesive layer comprises depositing a water insoluble adhesive on the outer surface of the substrate body. According to another technique, the adhesive layer is formed by depositing a solvent on at least a portion of the outer surface of the substrate body, which results in the formation of an adhesive layer which affixes fibers to the substrate body. With certain plastics, for example, it is possible to form an adhesive surface which can adhere to fibers by softening the plastic through the use of solvents.

A variety of different adhesives may be employed in the present invention depending upon the desired fiber and substrate body to be employed. Examples of useful adhesives include cyanoacrylates, epoxies, urethanes, single and dual part epoxies, single and dual part polyurethanes, ultraviolet curable adhesives and other adhesives used in the art.

In one embodiment, a flexible adhesive is employed for the adhesive layer while in another embodiment a more rigid adhesive is employed for the adhesive layer, depending upon the effect, fiber and substrate body employed.

Since the lure of the present invention is designed to be used in water, the adhesive layer of the present invention is designed to be waterproof upon the hardening thereof. The word "water" as used throughout this specification and the appended claims refers to any aqueous medium including salt water, fresh water, ocean water, lake water, river water, etc.

Furthermore, in one embodiment, the method for forming a fishing lure of the present invention comprises providing a substrate, providing a fishing hook; and coupling the substrate body to the fishing hook. The substrate body may be coupled to the fishing hook before or after the step of electrostatically depositing a plurality of flocking fibers on the adhesive layer to form the substrate. In one embodiment, the electrostatic flocking is performed at about 25% to about 95% humidity, preferably about 65% humidity i.e., in a room having a humidity of about 65%.

In one embodiment of the present invention, an example of a flexible lure comprises: (i) a substrate body comprising plastisol; (ii) an adhesive layer comprising polyurethane; and (iii) electrostatic flocking fibers comprising nylon. In another embodiment, a rigid fishing lure comprises: (i) a substrate body comprising an acrylic material; (ii) an adhesive layer comprising cyanoacrylate; and (iii) electrostatic flocking fibers comprising nylon. However, these flexible and rigid lures are merely examples of a variety of different lures which can be formed using the techniques of the present invention.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A fishing lure, comprising:
   a hook; and
   a fishing lure substrate coupled to the hook, the substrate configured to stimulate the instinct of a fish to strike the fishing lure, the fishing lure substrate comprising a soft, flexible, resilient material, the fishing lure substrate including:
   (A) a fishing lure substrate body having an outer surface;
   (B) an adhesive layer on at least a portion of the outer surface of the substrate body; and
   (C) flocking fibers electrostatically deposited on the adhesive layer such that the fibers are affixed at an adhesion end thereof by the adhesive layer to the substrate body, the opposing free end of the flocking fibers extending away from the substrate body wherein the fishing lure substrate body can be selectively mounted on the hook.

2. A fishing lure as recited in claim 1, wherein the fishing lure comprises an artificial fly.

3. A fishing lure as recited in claim 1, wherein the fishing lure comprises a spinner.

4. A fishing lure configured to stimulate the instinct of a fish to strike, the fishing lure comprising:

a hook;

a fishing lure substrate body having an outer surface;

an adhesive layer on at least a portion of the outer surface of the substrate body; and flocking fibers electrostatically deposited on the adhesive layer such that the fibers are affixed at one end thereof by the adhesive layer to the substrate body, the opposing free end of the flocking fibers extending away from the substrate body, wherein the substrate body comprises an elastomeric material that is configured to be selectively punctured by the fishing hook such that the hook remains in the substrate body and retains the substrate body thereon.

5. A fishing lure as recited in claim 4, wherein the substrate body comprises plastisol.

6. A fishing lure as recited in claim 4, wherein the adhesive layer includes a phosphorescent pigment.

7. A fishing lure recited in claim 4, wherein the fibers have trilobal cross-sectional shapes.

8. A fishing lure recited in claim 4, wherein the fibers comprise natural polyester.

9. A fishing lure as recited in claim 4, wherein the substrate body comprises a flexible material simulating bait.

10. A fishing lure as recited in claim 4, wherein about 1% to about 99% of the fibers electrostatically deposited on the substrate body are shorter than the remainder of the fibers electrostatically deposited on the substrate body.

11. A fishing lure as recited in claim 10, wherein the substrate body comprises a manually separable material.

12. A fishing lure as recited in claim 4, wherein the substrate body comprises an elongate, flexible, manually separable material simulating the shape of a worm.

13. A fishing lure as recited in claim 4, wherein the substrate body comprises a flexible, manually separable material simulating bait that can be selectively coupled to a hook.

14. A fishing lure as recited in claim 4, wherein the flocking fibers extend substantially perpendicularly with respect to their adhesion sites on the substrate body.

15. A fishing lure configured to stimulate the instinct of a fish to strike, the fishing lure comprising:

a hook;

a substrate body having an outer surface and comprising an elastomeric material, the substrate body being selectively mounted on the hook;

a water insoluble adhesive layer on at least a portion of the outer surface of the substrate body; and flocking fibers electrostatically deposited on the adhesive layer such that the fibers are affixed at an adhesion end thereof by the adhesive layer to the substrate body, the opposing free end of the flocking fibers extending away from the substrate body.

16. A fishing lure as recited in claim 15, wherein the adhesive layer includes a luminescent material.

17. A fishing lure kit having components used to selectively assemble a fishing lure, the fishing lure being configured to stimulate the instinct of a fish to strike the lure, the fishing lure kit comprising:

a fishing hook; and a first fishing lure substrate configured to stimulate the instinct of a fish to strike, the first fishing lure substrate configured to be selectively coupled to the fishing hook, the first fishing lure substrate including:

a substrate body having an outer surface, the first fishing lure substrate body comprising an elastomeric material;

a water insoluble adhesive layer formed on at least a portion of the outer surface of the substrate body; and flocking fibers electrostatically deposited on the adhesive layer such that the fibers are affixed at an adhesion end thereof by the adhesive layer to the substrate body, the opposing free end of the flocking fibers extending away from the substrate body.

18. A kit as recited in claim 17, further comprising a container configured to selectively receive the substrate and the fishing hook therein.

19. A kit as recited in claim 17, further comprising a second fishing lure substrate having flocking fibers electrostatically deposited thereon.

20. A kit as recited in claim 17, wherein the substrate comprises a manually separable material.

21. A kit as recited in claim 17, wherein the kit comprises a plurality of electrostatically flocked, modular substrates which can be selectively, manually coupled to the hook and which can be selectively assembled into a variety of different lure configurations.

22. A fishing lure kit having components used to selectively assemble a fishing lure, the fishing lure being configured to stimulate the instinct of a fish to strike the lure, the fishing lure kit comprising:

a fishing hook; and a plurality of fishing lure substrates configured to stimulate the instinct of a fish to strike, each fishing lure substrate configured to be selectively coupled to the fishing hook, each fishing lure substrate including:

a substrate body having an outer surface;

an adhesive layer formed on at least a portion of the outer surface of the substrate body; and flocking fibers electrostatically deposited on the adhesive layer such that the fibers are affixed at an adhesion end thereof by the adhesive layer to the substrate body.

23. A kit as recited in claim 22, wherein the plurality of fishing lure substrates can be selectively, manually assembled into a variety of different lure configurations.

24. A kit as recited in claim 22, wherein the adhesive layer comprises a water insoluble adhesive layer.

25. A method of manufacturing a fishing lure substrate configured to stimulate a fish to strike, the method comprising:

providing a fishing lure substrate body having an outer surface, the fishing lure substrate body comprising a soft, flexible, and resilient material that is selectively punctured by a fish hook;

forming an adhesive layer on at least a portion of the outer surface of the substrate body; and electrostatically depositing a plurality of fibers on the adhesive layer on at least a portion of the outer surface of the substrate body such that the fibers are affixed at an adhesion end thereof to the substrate body, the opposing free end of the flocking fibers extending away from the substrate body, such that the hook selectively punctures the fishing lure substrate body and remains in the fishing lure substrate body and retains the fishing lure substrate body thereon.

26. A method as recited in claim 25, wherein the step of forming an adhesive layer on at least a portion of the outer surface of the substrate body comprises depositing a water insoluble adhesive on at least a portion of the outer surface of the substrate body.

27. A method as recited in claim 25, wherein the step of forming an adhesive layer on at least a portion of the outer surface of the substrate body comprises depositing a solvent on at least a portion of the outer surface of the substrate body.

28. A method as recited in claim 25, wherein the fishing lure substrate comprises an object comprising a manually separable material.

29. A method as recited in claim 25, further comprising combining a luminescent material within the adhesive layer.

30. A method as recited in claim 25, wherein the substrate body comprises plastisol.

31. A method as recited in claim 25, wherein the fibers are configured such that air can be entrapped between intrafibral spaces.

32. A method for manufacturing a fishing lure configured to stimulate a fish to strike the lure, the method comprising:

providing a fishing lure substrate body having an outer surface, wherein the substrate body comprises an elastomeric material that can be selectively punctured by a fishing hook;

depositing a water insoluble adhesive layer on at least a portion of the outer surface of the substrate body;

electrostatically depositing a plurality of flocking fibers on at least a portion of the adhesive layer on the outer surface of the substrate body such that the fibers are affixed at an adhesion end thereof to the substrate body, the opposing free end of the flocking fibers extending away from the substrate body;

providing a fishing hook; and coupling the substrate body to the fishing hook by selectively puncturing the substrate body with the fishing hook.

33. A method as recited in claims 32, wherein the substrate body is coupled to the fishing hook after the step of electrostatically depositing a plurality of flocking fibers on the adhesive layer.

34. A method as recited in claim 32, wherein the substrate comprises a manually separable material.

35. A method as recited in claim 34, wherein the substrate is an elongate material that can be selectively coupled to the hook.

36. A method as recited in claim 32, wherein the fibers have different lengths, such that shorter fibers support longer fibers.

37. A method as recited in claim 32, wherein the fibers are configured such that air can be trapped between intrafibral spaces.

* * * * *

UNITED STATES PATENT AND TRADEMARK OFFICE
CERTIFICATE OF CORRECTION

PATENT NO. : 6,286,246 B1
DATED : September 11, 2001
INVENTOR(S) : Richard N. Rachal; Paul Lewis It is certified that error appears in the above-identified patent and that said Letters Patent is hereby corrected as shown below:

<u>Column 8,</u>
Line 5, change "acyrlic" to -- acrylic --

Signed and Sealed this

Twenty-sixth Day of March, 2002

Attest:

JAMES E. ROGAN
Attesting Officer     Director of the United States Patent and Trademark Office